United States Patent [19]

Ito et al.

[11] Patent Number: 5,679,988
[45] Date of Patent: Oct. 21, 1997

[54] ROCKING MOTOR

[75] Inventors: Akihiro Ito, Tokyo; Miyoshi Tanikawa, Yotsukaido; Kazuo Akimoto, Yotsukaido; Shigeru Tagami, Yotsukaido; Masaki Tanaka, Yotsukaido, all of Japan

[73] Assignee: Seiko Precision Inc., Japan

[21] Appl. No.: 532,158

[22] Filed: Sep. 22, 1995

[30] Foreign Application Priority Data

Sep. 22, 1994 [JP] Japan .................. 6-227931

[51] Int. Cl.$^6$ .................. H02K 33/00; H02K 35/00
[52] U.S. Cl. .................. 310/36; 310/37; 310/38; 318/114; 318/115; 318/119; 318/135
[58] Field of Search .................. 310/36, 37, 38; 318/114, 115, 119, 135

[56] References Cited

U.S. PATENT DOCUMENTS

| | | | |
|---|---|---|---|
| 4,088,909 | 5/1978 | Matsumura et al. | 310/49 R |
| 4,144,467 | 3/1979 | Nakajima et al. | 310/49 R |
| 4,287,457 | 9/1981 | Takemura | 318/133 |
| 4,644,211 | 2/1987 | Idogaki et al. | 310/266 |
| 4,795,929 | 1/1989 | Elgass et al. | 310/36 |
| 5,334,893 | 8/1994 | Oudet et al. | 310/38 |

FOREIGN PATENT DOCUMENTS

| | | |
|---|---|---|
| 1080458 | 8/1967 | United Kingdom . |
| 2183930 | 6/1987 | United Kingdom . |
| 2221584 | 2/1990 | United Kingdom . |

*Primary Examiner*—Steven L. Stephan
*Assistant Examiner*—Elvin G. Enad
*Attorney, Agent, or Firm*—Adams & Wilks

[57] ABSTRACT

A rocking motor comprises a coil wound around a hollow coil bobbin. A rotor is rotatably mounted at a position close to an end portion of the coil bobbin. The rotor has a center shaft and a permanent magnet and is magnetized with two poles such that the positions of the poles are located close to the coil and the magnetization angle is greater than 90 degrees but less than 180 degrees. The positions of the poles of the rotor and the coil are adjacent to one another so that a rotary torque can be efficiently obtained by a magnetic force generated by the coil. The rocking motor can generate a high power output with a relatively low power supply and its operational performance is not adversely affected by an external magnetic field.

26 Claims, 12 Drawing Sheets

Equipotential Line

ROCKING MOTOR

BACKGROUND OF THE INVENTION

1. Field of the Invention

The present invention relates to a rocking motor having a rotor which operates by rocking motion.

2. Background Information

Conventionally, there has been known an oscillating or rocking motor in which a coil is energized to serve as an electromagnet for applying a magnetic force to a rotor having a magnet and subjecting the rotor to an oscillating or rocking motion. In such a conventional rocking motor, a permanent magnet magnetized with two or four poles has been used. In the case of a permanent magnet with two poles, the poles typically have a magnetization angle of 180 degrees and are located at positions along the center line of the rotor. In the case of a permanent magnet with four poles, the poles typically have a magnetization angle of 90 degrees.

One of the problems inherent in conventional rocking motors has been obtaining a high power output efficiently while maintaining power consumption as low as possible. For example, unexamined Japanese Utility Model Publication No. 93-70168 discloses such an arrangement where a magnetic force induced by a coil and a rotor located inside of the windings of the coil are effectively used to obtain a high power output. However, since this arrangement requires mounting bearings inside of a coil bobbin, it cannot precisely hold the rotor and, therefore, it is difficult to make practical use of such a rocking motor.

Another problem with conventional rocking motors is that the rocking motor is affected by a magnetic field outside of the rocking motor, which causes the operation of the rocking motor to become unstable. Furthermore, in the case of using a rocking motor which has a rotor magnetized with more than four poles, there is a problem that the rocking motor magnetically affects other components located outside of the rocking motor during operation of the motor. This, in turn, restricts the place where the rocking motor can be used.

Thus, there is a need for an improved rocking motor which can efficiently generate a high power output with a simple structure and low power consumption, and which does not magnetically affect other components located outside of the rocking motor.

SUMMARY OF THE INVENTION

An object of the present invention is to provide an oscillating or rocking motor having a relatively simple structure which can efficiently generate a high power output with low power consumption, which is not affected by an external magnetic field and which does not magnetically affect other components located outside of the rocking motor.

The foregoing and other objects of the present invention are carried out by a rocking motor comprising a hollow body member having a first end portion, a second end portion, and a connecting portion disposed between the first and second end portions, a coil wound on the connecting portion of the body member, and a rotor rotatably supported near the first end portion of the body member. The rotor has a permanent magnet magnetized with at least a first pair of poles having a magnetization angle greater than 90 degrees but less than 180 degrees, the poles being radially offset from the center of the rotor and toward the coil.

In another embodiment, the rotor of the rocking motor has a second pair of poles radially offset from the center of the rotor and away from the coil and having a lower magnetic force than the first pair of poles.

Preferably, the rocking motor in the first and second embodiments has a magnetic yoke member secured to the body member for preventing a magnetic field produced by the coil from leaking out of the rocking motor.

DETAILED DESCRIPTION OF THE PREFERRED EMBODIMENTS

Figure 1:
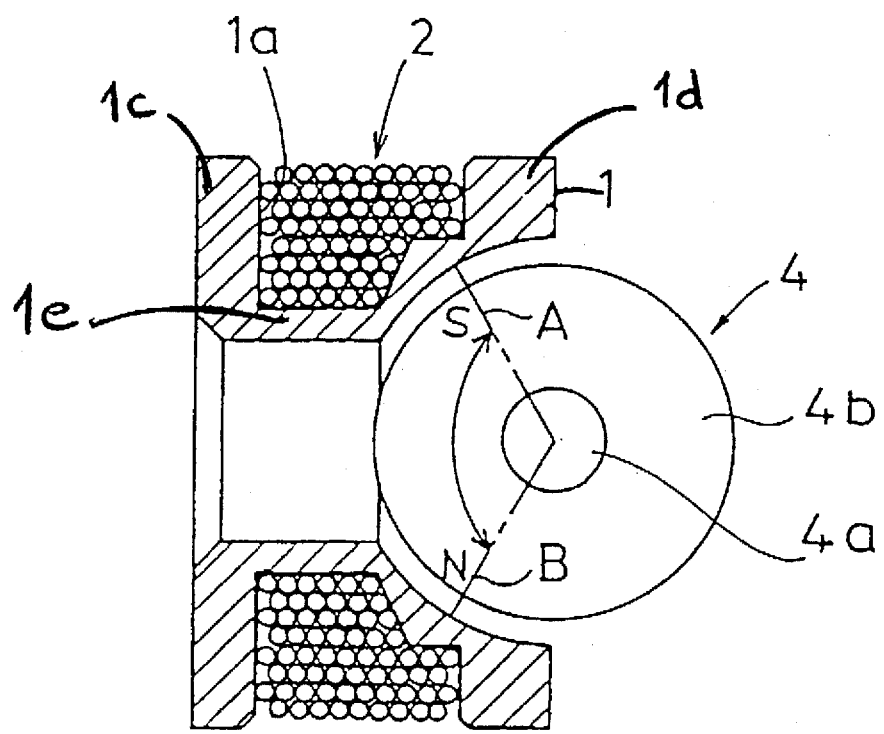
FIG. 1 is a sectional plan view of a rocking motor according to a first embodiment of the present invention.
Figure 2:
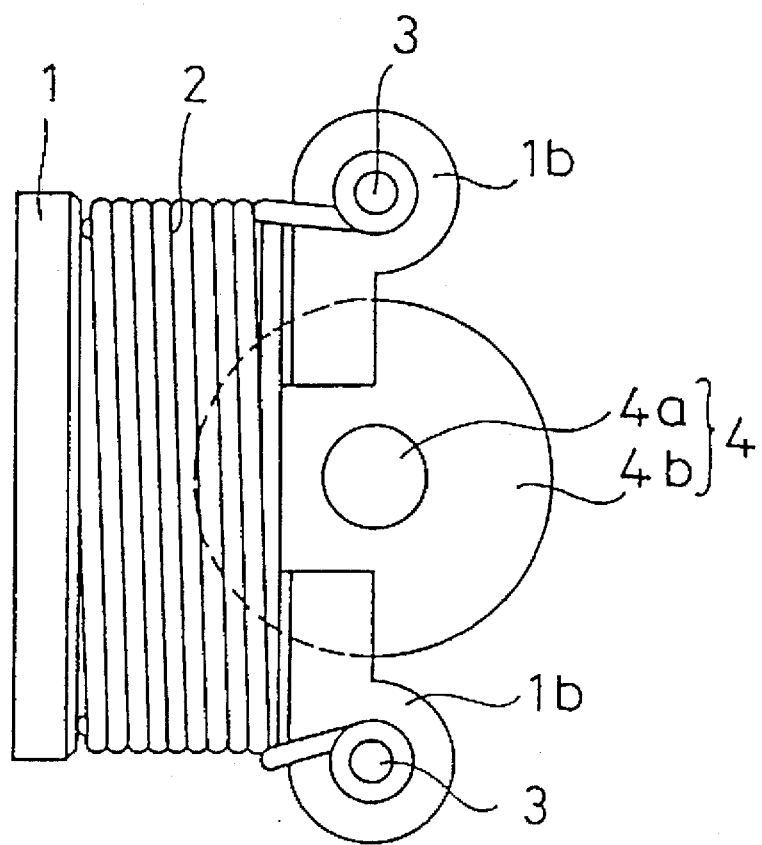
FIG. 2 is a plan view of the first embodiment.
Figure 3:
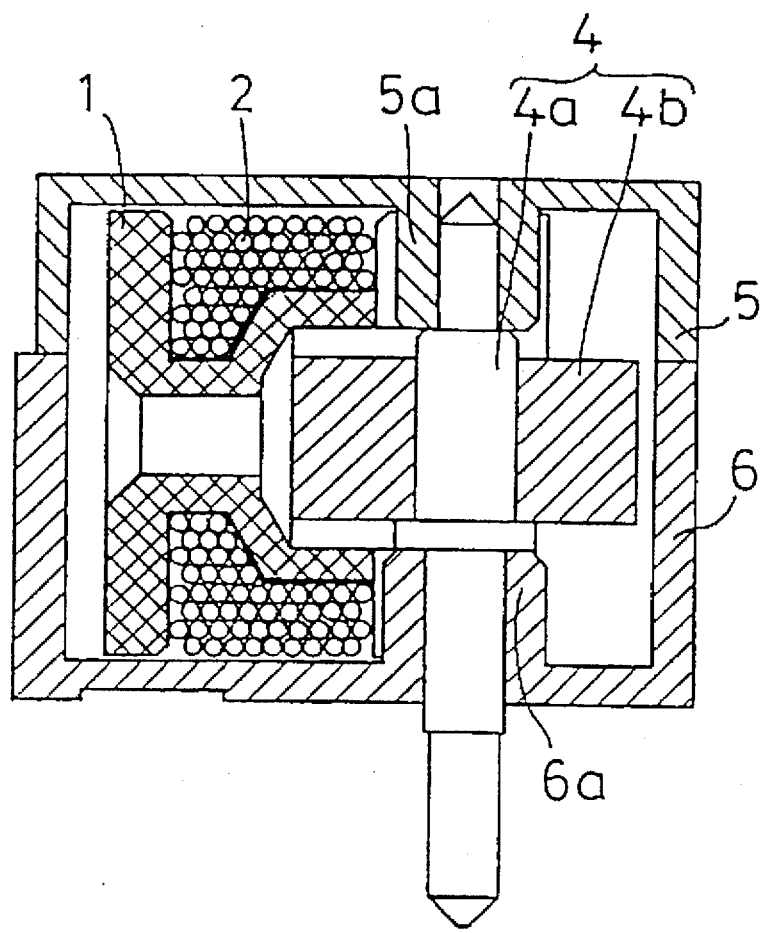
FIG. 3 is a sectional side view of the first embodiment in which a casing is attached.

A first embodiment of a rocking motor according to the present invention is shown in FIGS. 1 to 3. Referring to FIG. 1, a hollow coil bobbin 1 comprises a hollow body member comprised of a plastic material. The body member has a pair of opposed end portions 1c and 1d interconnected by a tubular or hollow connecting portion 1e disposed between the end portions 1c,1d and defining a circumferential recess 1a. A coil 2 is wound around the tubular portion 1e in the recess 1a of the coil bobbin 1. As shown in FIG. 2, a pair of terminal portions 1b are provided at the end portion 1d of the coil bobbin 1, and electrically conductive pins 3 comprised of metal material or the like are connected to and project outwardly from respective ones of the terminal portions 1b. The two ends of the coil 2 are electrically connected to the conductive pins 3. The conductive pins 3 are connected to a power supply means (not shown) for energizing the coil 2 through the conductive pins 3.

A rotor 4 is rotatably supported at a position near the end portion 1d of the coil bobbin 1. The rotor 4 is comprised of a metal center shaft 4a and a permanent magnet 4b, such as a sintered samarium cobalt (Sm—Co) or a plastic magnet (Pla-Mag). The rotor 4 is magnetized with two poles N,S, and the magnetized positions A,B of the poles are offset in the radial direction from the center of the rotor towards the coil 2 and have an obtuse magnetization angle which is greater than 90 degrees but less than 180 degrees. As shown in FIG. 1, radial lines coincident with the pole positions A,B form an obtuse angle. In the particular embodiment shown in FIG. 1, the magnetized positions A,B of both poles are shifted from a diametrical line toward the coil 2 and are located within a hollow body portion of the coil bobbin 1 defined by a recessed part of the end portion 1d. Preferably, the magnetization angle of the poles at the positions A,B in the present embodiment is about 120 degrees.

It is noted that, in the case of any difficulty in carrying out magnetization at a magnetization angle of 120 degrees for a true circular rotor, the rotor 4 may be formed with a non-magnetic part (which does not serve as a magnet) which is disposed at the opposite position to the coil 2, remote from the coil, so as to carry out the magnetization at a magnetization angle of 120 degrees. By this construction, no hindrance to the operation occurs even though the rotor 4 does not have magnetism on the side thereof remote from the coil 2.

FIG. 3 is a longitudinal sectional view showing the coil bobbin 1 and the coil 2 shown in FIGS. 1 and 2 housed in a casing comprised of upper and lower casing sections 5,6. The coil bobbin 1 is clamped vertically between the upper and lower casing portions 5,6, and the center shaft 4a of the rotor 4 is rotatably supported by the casing sections 5,6 through bearings 5a,6a.

In the embodiment of FIGS. 1–3, when the coil 2 is energized by the power supply means (not shown) through the conductive pins 3, the coil 2 serves as an electromagnet. The action points between the rotor 4 and the coil 2 are in the vicinity of points X,Y (FIG. 5) where the positions A,B of the poles of the permanent magnet 4b and the coil 2 are adjacent to one another. Accordingly, when a current in a first direction is supplied to the coil 2, the permanent magnet 4b receives at the pole position A an attraction force from the action point X, but receives at the pole position B a repulsion force from the action point Y so that the rotor 4 rotates in a first direction. Further, when a current in a second reverse direction is supplied to the coil 2, the permanent magnet 4b receives a repulsion force at the pole position A from the action point X, but receives an attraction force at the pole position B from the action point Y so that the rotor 4 is rotated in a second direction opposite the first direction. Accordingly, as the direction in which the current is supplied to the coil 2 is alternately changed, the rotor 4 is subjected to reciprocal rocking or oscillating motion. In this embodiment, the rocking motion of the rotor 4 is preferably within a range of about ±5 degrees.

In the rocking motor according to the first embodiment, since the permanent magnet 4b of the rotor 4 is magnetized with two poles at the positions A,B which are radially offset from the center of the rotor 4 but near the coil 2, and the pole positions A,B are adjacent the coil 2 so that a torque for rotating the rotor 4 can be effectively produced by a magnetic force generated by the coil 2, a high power output can be obtained even though the power supplied is low. An explanation of this improvement over conventional rocking motors will be given with reference to FIGS. 4 and 5.

Figure 4A:
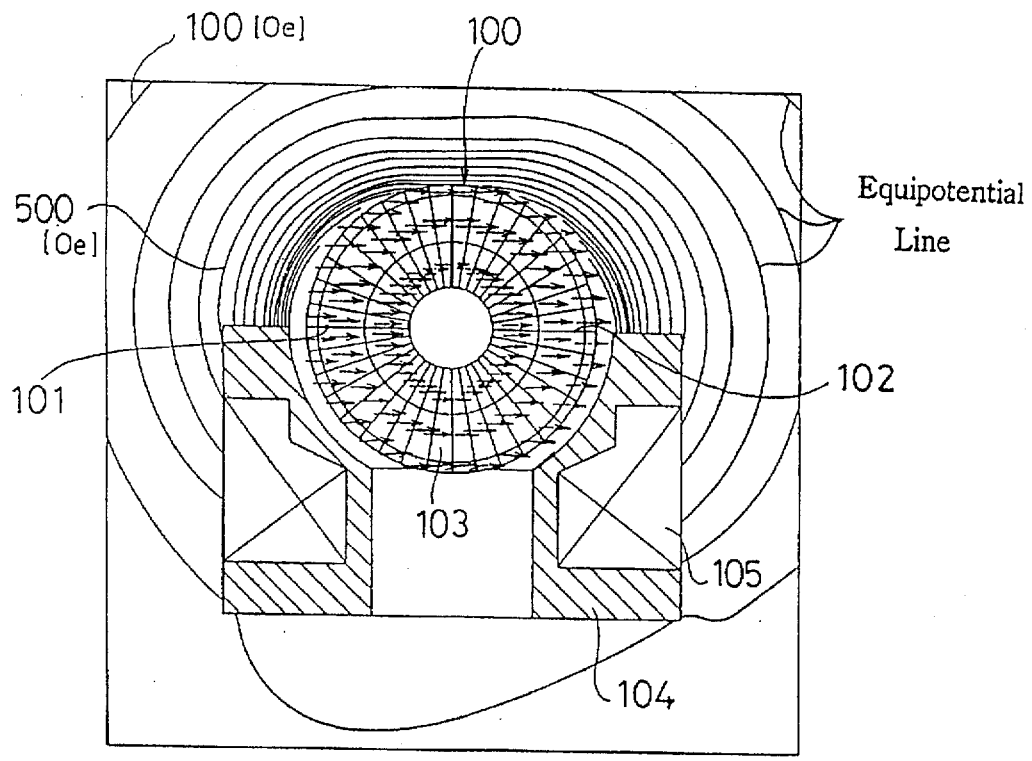
FIGS. 4a and 4b are explanatory views showing the magnetic field of a conventional rocking motor.

FIG. 4 shows a pattern of a magnetic field in a conventional rocking motor. A permanent magnet 103 is magnetized at an angle of 180 degrees with two poles 101, 102 which are located on the center line of a rotor 100. Referring to FIG. 4(a), equipotential lines obtained by connecting points where the magnetic field has an equal intensity, at intervals of 100 Oe, are shown around the rotor 100 and a coil bobbin 104. Thus, it is understood that the greater the distance between the rotor 100 and the coil bobbin 104, the weaker the intensity of the magnetic field. Conversely, the smaller the distance between the rotor 100 and the coil bobbin 104, the stronger the intensity of the magnetic field.

In FIG. 4(a), the direction and the intensity of the magnetic field is shown by arrows at the inside of the rotor 100. A magnetic field directed from the pole 101 to the pole 102 exists in the permanent magnet 103. Since a magnetization at an angle of 180 degrees is used in this embodiment, a magnetic field directed from the left to the right in FIG. 4(a) is generated in parallel with a coil 105. On the other hand, a magnetic field is generated outside of the coil bobbin 104 along the contour thereof when the coil 105 is energized.

Figure 4B:
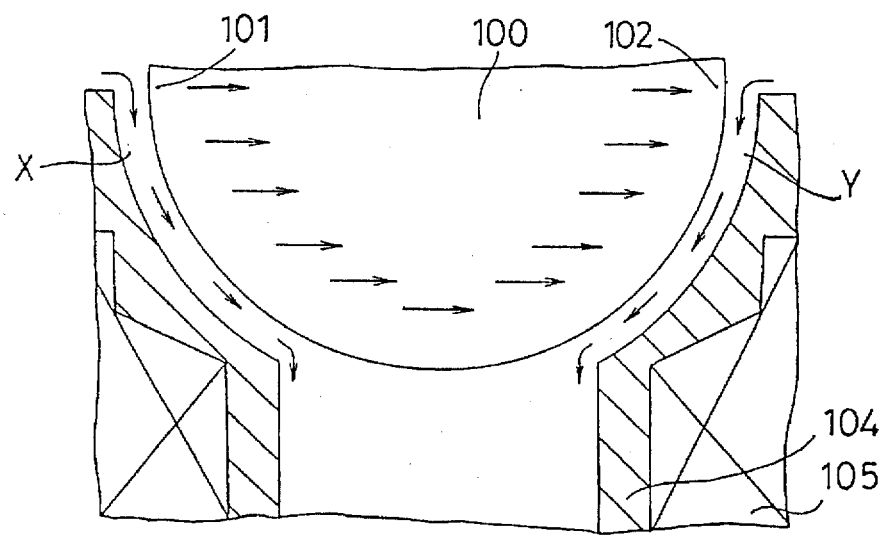

Referring to FIG. 4(b), which is an enlarged view of a portion of FIG. 4(a), since the direction of the magnetic field generated in the permanent magnet 103 and the direction of the magnetic field generated outside of the coil bobbin 104 form an angle with which they are substantially parallel with each other, in the vicinity of the action points X,Y, a torque cannot be efficiently obtained from the magnetic force. That is, the reason why the rocking motor receives a torque is that if the permanent magnet 103 is not present, a magnetic field is generated along the coil bobbin 104 when the coil 105 is energized. However, if the permanent magnet 103 is present, the magnetic field generated along the coil bobbin 104 interferes with the magnetic field generated by the permanent magnet so as to generate magneto-striction in the magnetic field and, accordingly, a force with which the magneto-striction is to be nulled is effected and serves as the rotary torque. Furthermore, as shown in FIG. 4(b), if the direction of the magnetic field (which is as shown if the permanent magnet 103 is not present) caused by energizing the coil 105 is substantially parallel with the direction of the specific magnetic field of the permanent magnet 103, less magneto-striction is caused in the direction of the magnetic field. Accordingly, a force for nulling this magneto-striction is small and, as a result, the resulting rotary torque is also small.

Figure 5A:
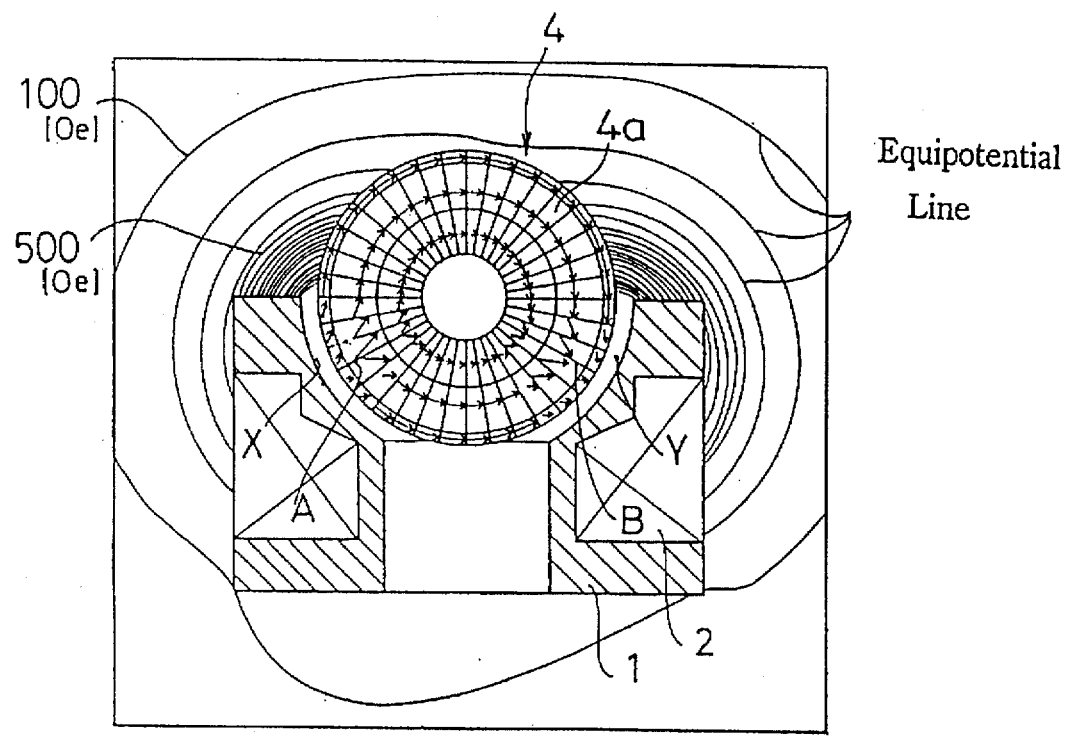
FIGS. 5a and 5b are explanatory views showing the magnetic field of the rocking motor according to the present invention.

FIG. 5 shows a pattern of a magnetic field in a rocking motor according to the present invention. Comparing the equipotential lines shown in FIG. 5(a) with those shown in FIG. 4(a), the equipotential lines shown in FIG. 5(a) are more densely present in the vicinity of the coil bobbin 1, but are less dense at a position remote from the coil bobbin. By comparing the equipotential line indicating a magnetic field intensity of 500 Oe, the equipotential line in this embodiment is located considerably much closer to the coil bobbin 1 than in the conventional rocking motor shown in FIG. 4. That is, when the conventional rocking motor is driven, the magnetic field is generated even up to a position at a relatively long distance from the rocking motor. According to the present invention, however, the magnetic field is generated only in the vicinity of the rocking motor during operation thereof. Accordingly, the magnetic affect upon components outside of the rocking motor during operation of the rocking motor is smaller than that in conventional rocking motors.

Furthermore, the presence of an external magnetic field outside of the rocking motor affects the operation of the rocking motor. The conventional rocking motor generates a magnetic field in a broad area around the rocking motor during its operation. On the other hand, since the rocking motor according to the present invention concentrically generates a magnetic field in a narrow area around the rocking motor during operation thereof, the external magnetic field does not interfere with nor affect the operation of the rocking motor unless it is mounted too closely to the rocking motor. Thus, since the rocking motor according to the present invention does not exert a magnetic affect upon components outside of the rocking motor and is not subjected to magnetic affects from such components, the operational stability of the rocking motor is remarkably improved.

Figure 5B:
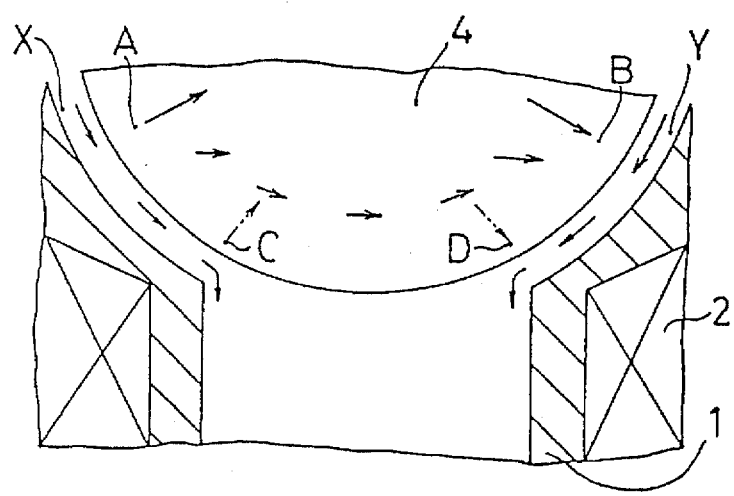

Furthermore, since the magnetic field in the rotor 4 shown in FIG. 5 is preferably magnetized at an angle of 120 degrees, an arc magnetic field extends from pole position A to pole position B and it does not extend through the center axis of the rotor. That is, as shown in FIG. 5b, in areas around the pole positions A,B, the magnetic field is generated substantially radially thereof. Accordingly, since the direction of the magnetic field which is generated along the contour of the coil bobbin 1 when the coil 2 is energized and the direction of the magnetic field in the permanent magnet form an angle therebetween close to a right angle at the action points X,Y of the rotor 4 and the coil 2, a rotary torque for the rotor can be efficiently obtained from a magnetic force generated by the coil. That is, as shown in FIG. 5(b), since the direction of the magnetic field (which is shown as if no permanent magnet is present) which is generated by energizing the coil 2 and the direction of the magnetic field inherent to the permanent magnet form an angle close to a right angle, the magneto-striction becomes larger. Thus, the force for nulling this magneto-striction becomes large so that a large rotary torque can be obtained. Furthermore, as shown by the two-dot chain line in FIG. 5(b), if the magnetization angle is less than 90 degrees, the distances between the action points X,Y and the pole positions C,D become longer, and the direction of the magnetic field of the coil 2 is nearly parallel with that of the permanent magnet which, as a result, causes the output efficiency to become lower.

According to experiments carried by the applicant, the lowest operating voltage (which is at least required for effecting the motion of the rotor since the rotor is not driven at a voltage which is lower than this lowest operating voltage) in the rocking motor according to the present invention, having the magnetization at an angle of 120 degrees, is lower than in the conventional rocking motor having the magnetization at an angle of 180 degrees by about 40%.

Figure 6:
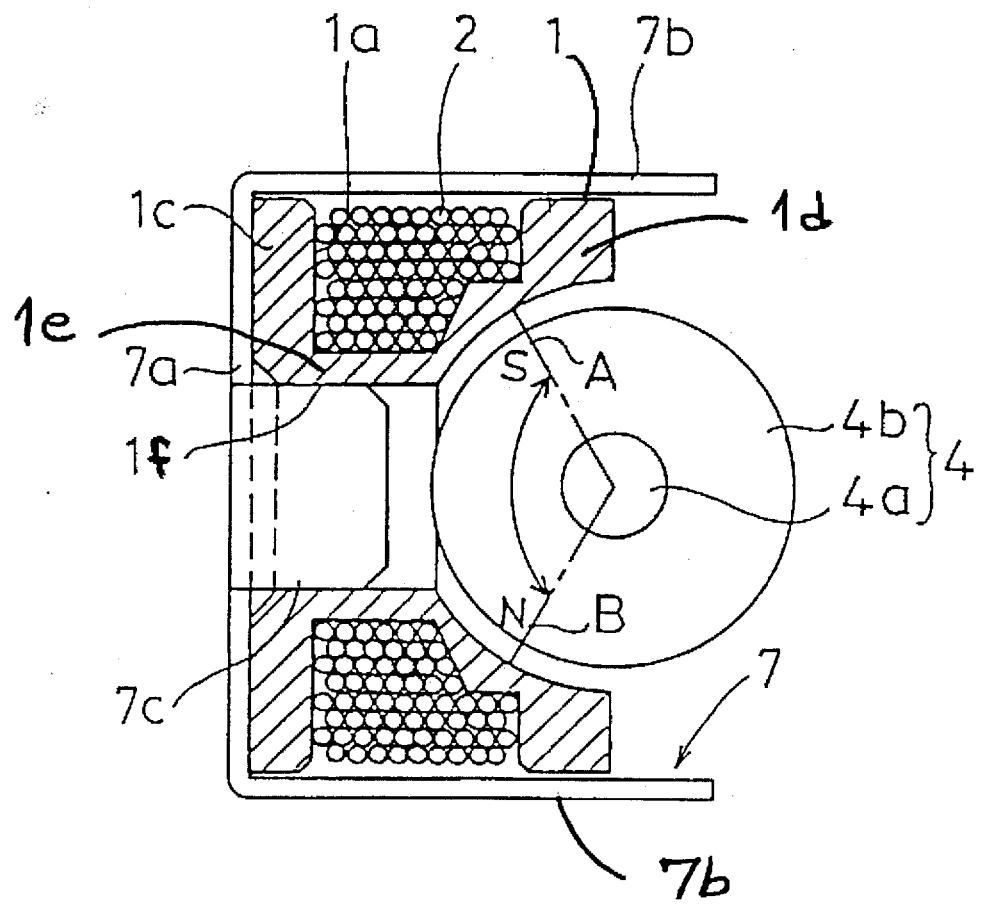
FIG. 6 is a sectional plan view of a rocking motor according to a second embodiment of the present invention.
Figure 7:
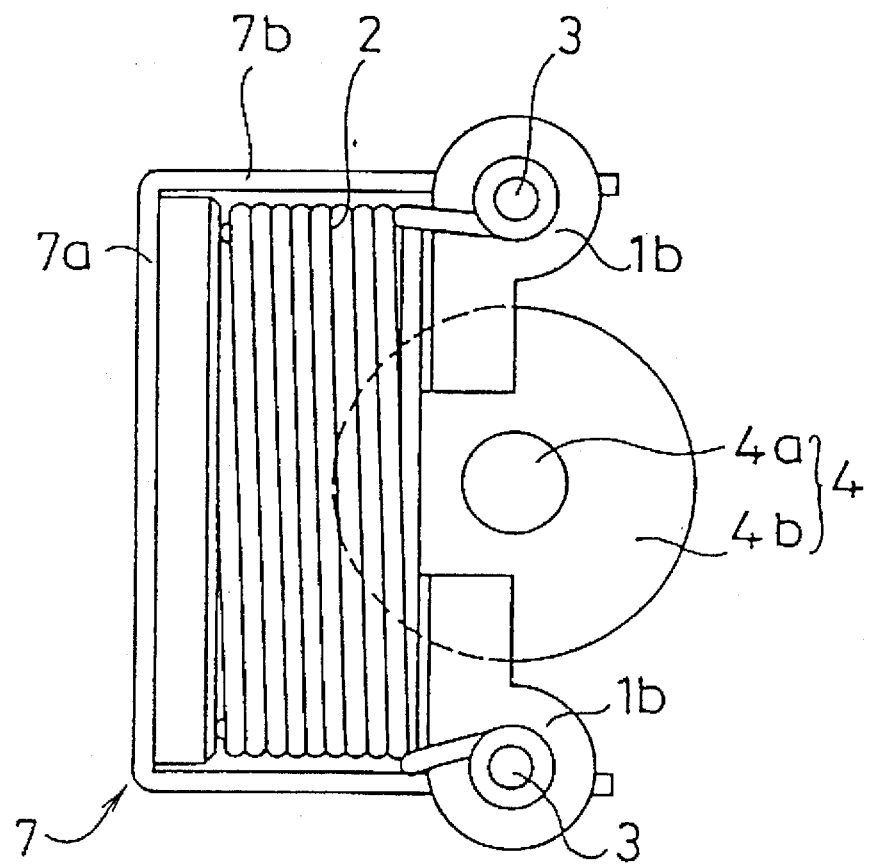
FIG. 7 is a plan view of the second embodiment of the present invention.
Figure 8:
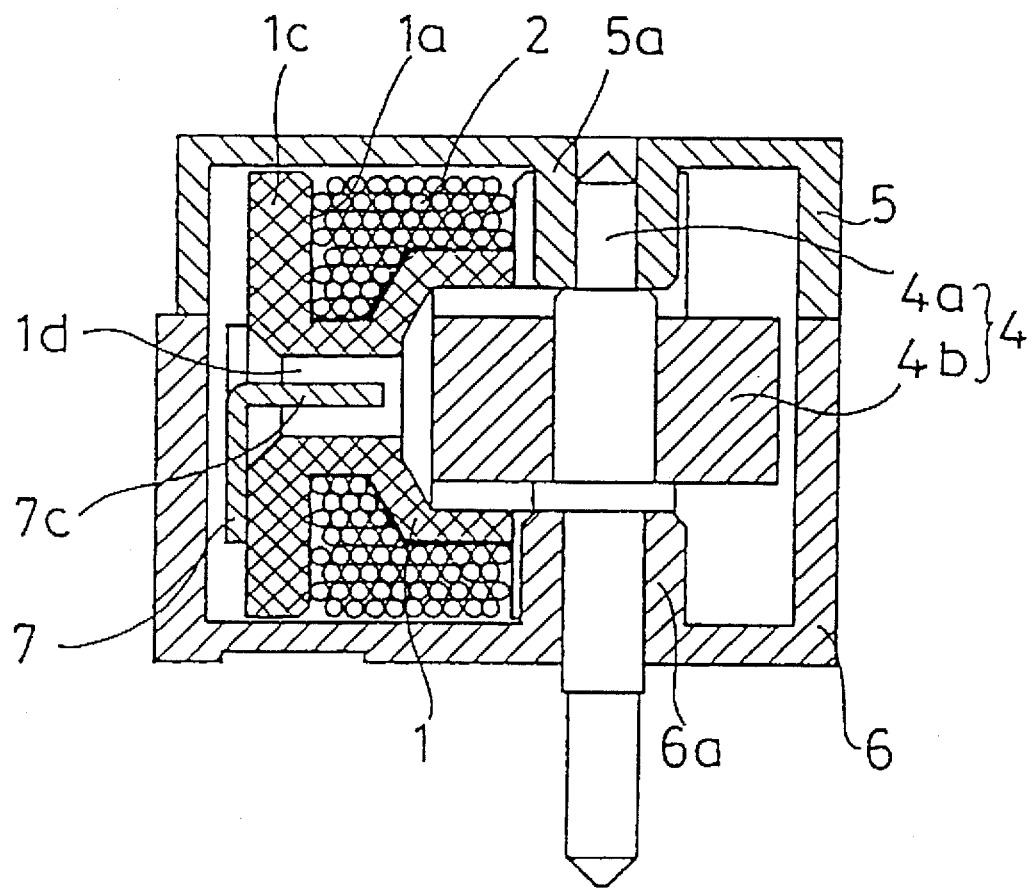
FIG. 8 is a sectional side view of the second embodiment in which a casing is attached.

FIGS. 6 to 8 show a second embodiment of the present invention. In the second embodiment, the only difference from the first embodiment shown in FIGS. 1 to 3 is the presence of a yoke member 7, and all other components thereof are the same as those of the first embodiment. Accordingly, an explanation of similar components will be abbreviated.

The yoke member 7 is comprised of a magnetic material and has a base portion 7a secured to the end portion 1c of the coil bobbin 1, a pair of legs or extension portions 7b extending from the base portion 7a, and a core portion 7c extending into the hollow interior of the hollow connecting portion 1e of the coil bobbin having a wall surface 1f. By this construction, a magnetic force produced from the coil 2 is prevented from leaking outside of the rocking motor, and the rotor 4 can be operated more efficiently.

Figure 9:
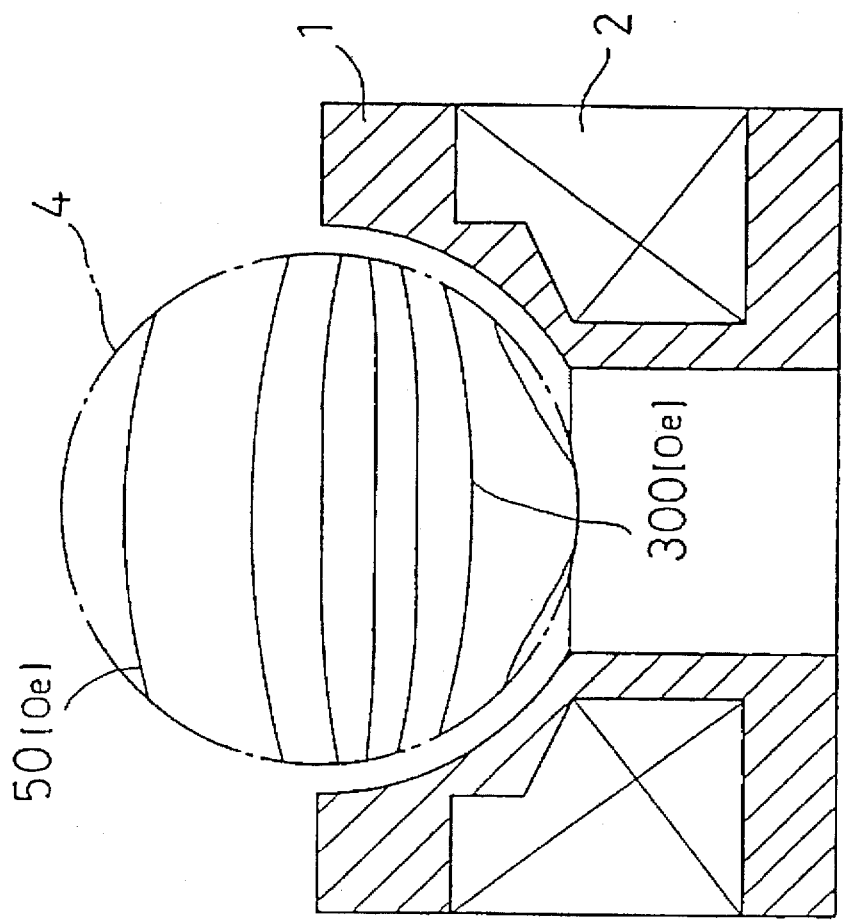
FIG. 9 is an explanatory view showing equipotential lines at the position of a rotor in a condition in which a permanent magnet is removed.
Figure 10:
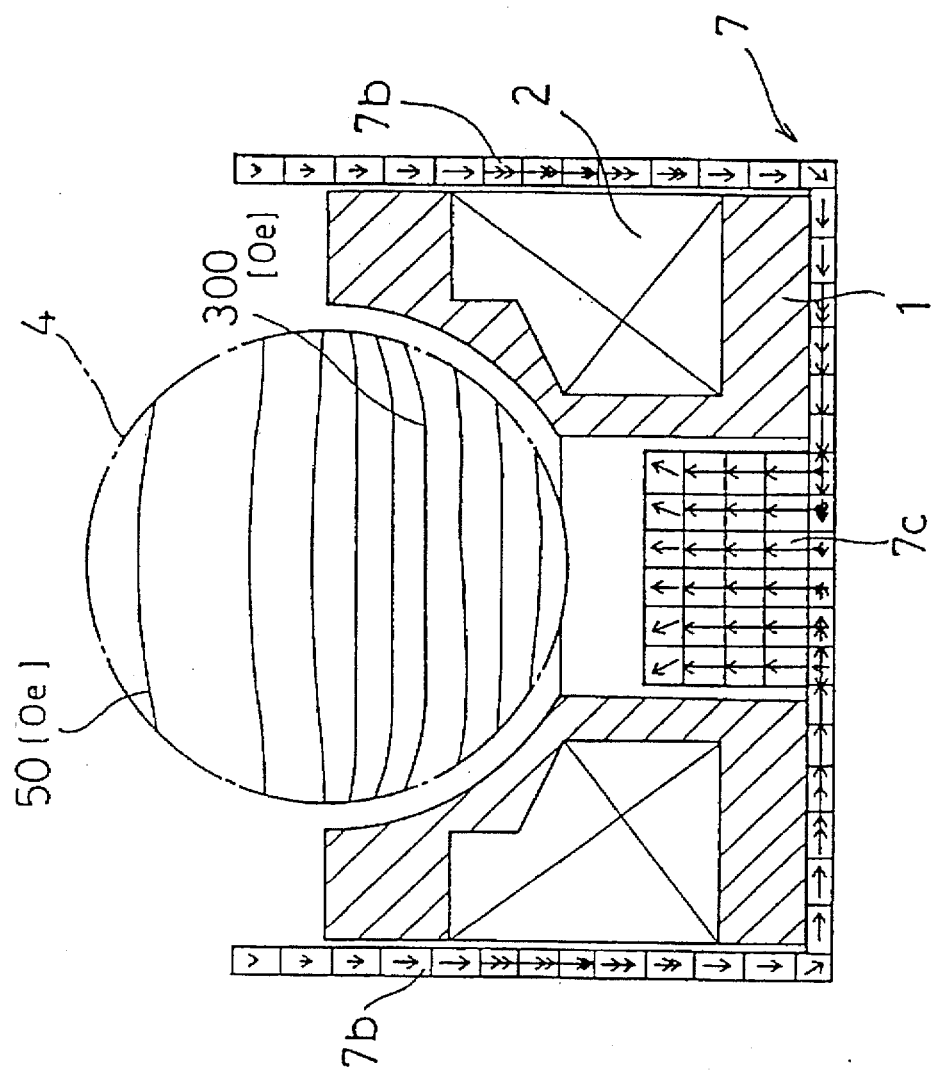
FIG. 10 is an explanatory view showing a yoke member in the arrangement shown in FIG. 9.

FIG. 9 shows equipotential lines (which are obtained by connecting points at intervals of 50 Oe) at the position of the rotor 4 in the first embodiment of FIGS. 1–3 which does not have a yoke member, and FIG. 10 shows equipotential lines at the position of the rotor 4 and the pattern of the magnetic field inside of the yoke member 7 in the second embodiment of FIGS. 6–8 which includes a yoke member. It is clear from the comparison with the equipotential lines at 300 Oe that the intensity of the magnetic field in the second embodiment is higher. In the vicinity of the center of the coil 2, the intensity of the magnetic field in the first embodiment is about 350 Oe, but in the second embodiment it is about 450 Oe. Thus, a larger magnetic force can be obtained in the second embodiment and, accordingly, the rotary torque can be enhanced by about 30%. It is noted that FIGS. 9 and 10 show equipotential lines in the case in which the rotor 4 is not actually present and, accordingly, it is possible to compare the case in which no yoke member is provided with the case in which a yoke member is provided.

Moreover, the rocking motor according to the second embodiment has no static stable position so that the position during deenergization is not uniform but free. That is, since the distance between the pole positions A,B and the yoke extension portions 7b is long, as shown in FIG. 6, and since a magnet having a weaker magnetic force can be used due to the high power output efficiency, as described above, the force for holding the rotor at a predetermined position during deenergization is low in comparison with conventional rocking motors. Accordingly, no resistance is caused in such a case that the gears engaged with the rotor are rapidly rotated for resetting when the rocking motor is stopped.

Figure 11:
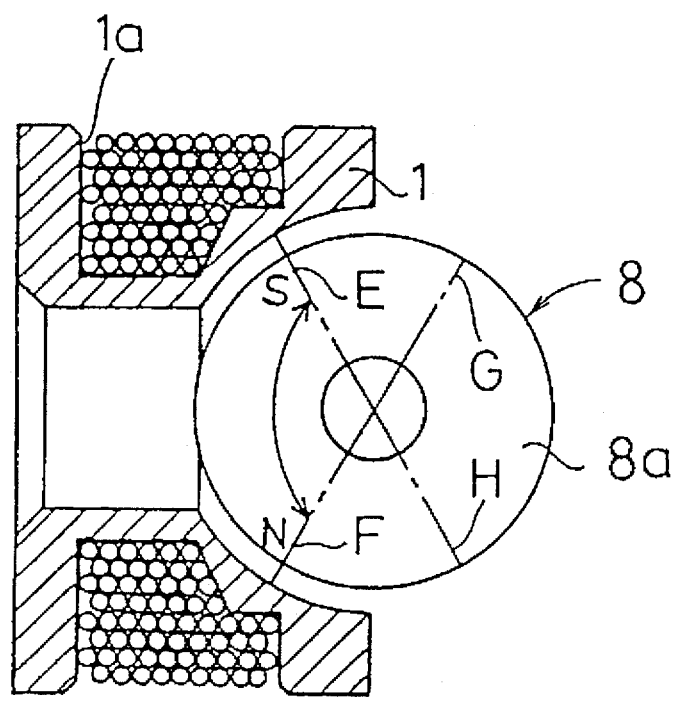
FIG. 11 is a sectional plan view of a rocking motor according to a third embodiment of the present invention.

FIG. 11 shows a third embodiment of a rocking motor according to the present invention. In this embodiment, a rotor 8 having a permanent magnet 8a magnetized with four poles is used. The construction of the rocking motor in the present embodiment, except for the rotor 8, is the same as that of the rocking motor in the first embodiment and, accordingly, an explanation thereof will be abbreviated.

In the first and second embodiments, since a rotor magnetized with two poles is used, the manufacture of a magnet magnetized with two poles whose positions are one-sided is relatively difficult. Accordingly, in order to facilitate the manufacture of the rocking motor, the third embodiment uses a permanent magnet 8a magnetized with four poles as shown in FIG. 11.

In order that the third embodiment obtains the same effects as that of the first and second embodiments, the positions E,F of two of the four poles are offset in the radial direction from the center of the rotor 8 and near the coil 2 and have an obtuse magnetization angle which is more than 90 degrees but less than 180 degrees. That is, the positions E,F of these two poles are substantially the same as that of the pole positions A,B in the first and second embodiments. The remaining two pole positions G,H are offset radially from the center of the rotor 8 and remote from the coil 2 and are symmetric with the pole positions E,F about the center of the rotor. Since the poles at the positions G,H are further from the coil 2 than the poles at the positions E,F, the poles at the positions G,H effect magnetic forces which are considerably weaker than that of the poles at the positions E,F. Thus with two of the poles at the positions G,H, the manufacture of the permanent magnet 8a is greatly facilitated. Since the poles at positions G,H effect weak magnetic forces in comparison with the poles at positions E,F, the poles at positions G,H do not affect the motion of the rotor 8. Furthermore, the poles at positions G,H neither magnetically affect components outside of the rocking motor nor are they magnetically affected by a magnetic field outside of the motor.

Figure 12:
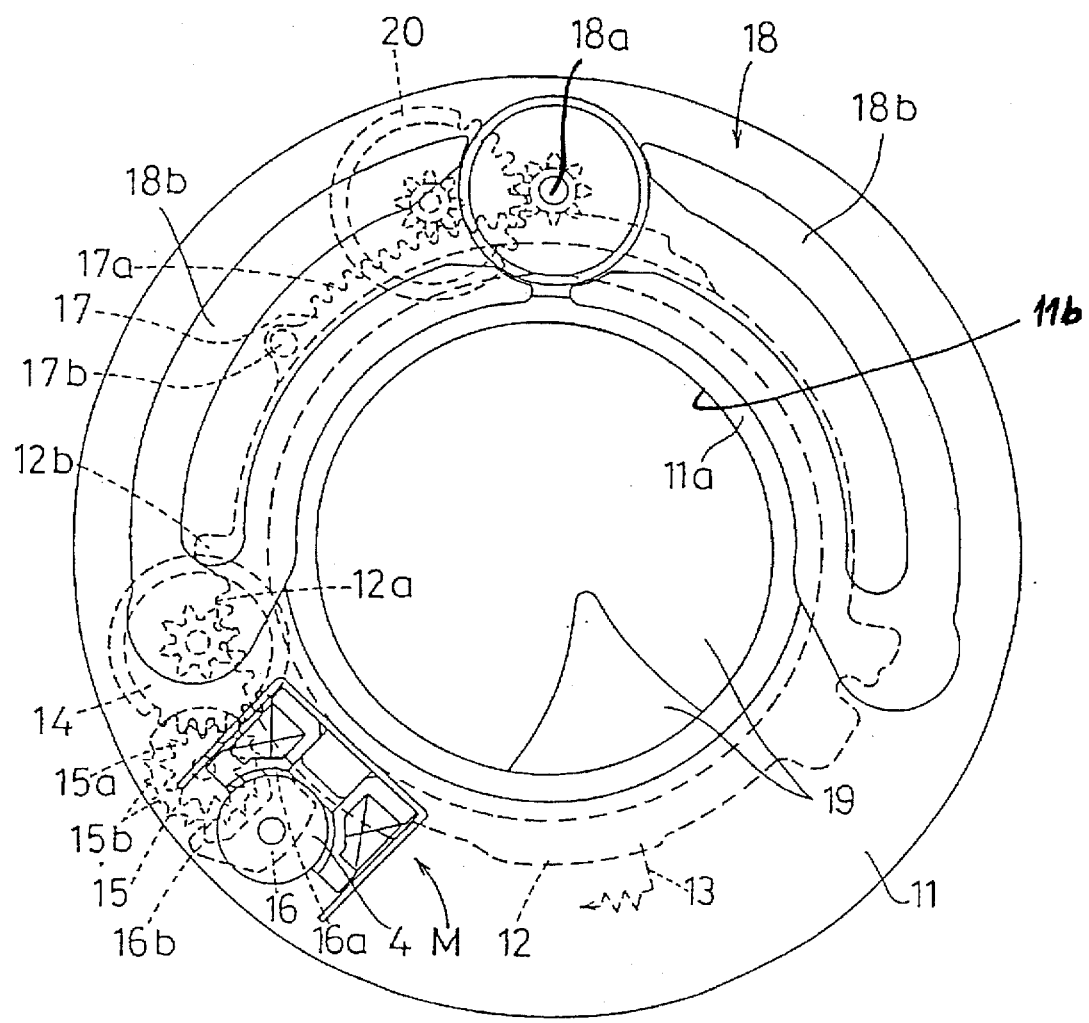
FIG. 12 is a front view showing a shutter device for a camera in which the rocking motor according to the second embodiment of the present invention is incorporated.

FIG. 12 shows the main components of a shutter device in a camera in which the rocking motor according to the second embodiment of the present invention is incorporated. A shutter lower plate 11 has a stationary lens barrel portion 11a for supporting a lens barrel (not shown). Female helicoid threads are cut on the inner periphery of the stationary barrel portion 11a which are threadedly engaged with male helicoid threads formed on the lens barrel. By such a construction, the lens barrel can be displaced along an optical axis direction in association with its rotation, which will be explained hereinbelow, so as to change its focal position.

In order to rotate the lens barrel, a lens setting ring 12 is rotatably fitted on the outer periphery of the stationary lens barrel portion 11a. The lens setting ring 12 has a protrusion (not shown) which engages an engaging portion of the lens barrel. Accordingly, the lens barrel is rotated together with the lens setting ring 12. The lens setting ring 12 is urged clockwise by a spring 13.

The lens setting ring 12 has, on its outer peripheral portion, a rack portion 12a which is engaged with a gear 15a of a ratchet wheel 15 through an intermediate gear 14. The ratchet wheel 15 can be rotatably mounted on the shutter lower plate 11. A plurality of pawls 15b are formed on the outer periphery of the ratchet wheel 15 at equal pitches. An anchor 16 is rocked integrally with the rotor of a rocking motor M, which is constructed according to the present invention, and the anchor 16 has a pair of locking pawls 16a,16b adapted to be alternately meshed with the pawls 15b of the ratchet wheel 15. Positions where the locking pawls 16a,16b are engaged with the pawls 15b of the ratchet wheel 15 are shifted from each other by a one-half the pitch of the pawls 15b. That is, when the anchor 16 rocks or pivots from the position where the locking pawl 16a is engaged with one of the pawls 15b to the position where the locking pawl 16b is engaged with one of the pawls 15b, the ratchet wheel 15 is turned through the intermediate gear 14 by an angle corresponding to one-half the pitch of the pawls 15b by the biasing action of the spring 13.

The ratchet wheel 15 is engaged with a locking member (not shown) at an initial condition of the shutter. When a drive ring 17 is turned clockwise, the engagement is released. The drive ring 17 is rotatably fitted on the outer periphery of the stationary barrel portion 11a of the shutter lower plate 11. The drive ring 17 has a rack portion 17a which meshes with a gear of a rotor 18a of a drive motor 18 which rotationally drives the ring 17 in forward and reverse directions. A pin 17b on the drive ring 17 is engageable with an engaging portion 12b of the lens setting ring 12 when the drive ring 17 is turned counterclockwise, thereby turning the lens setting ring 12 counterclockwise, overcoming the urging force of the spring 13. When the drive ring 17 is turned clockwise, it is engageable with a sector ring (not shown) so as to be rotated integrally with the sector ring. The drive motor 18 is arranged such that the rotor 18a is rotatably located in a gap defined between a pair of stators 18b. When electric power is supplied to the motor 18 from a power source (not shown), the rotor 18a is accordingly rotationally driven.

The operation of the shutter device will be explained with reference to FIG. 12. When a shutter button (not shown) is depressed in the initial condition, the rocking motor M is at first energized and, accordingly, the locking pawl 16b of the anchor 16 is engaged with one of the pawls 15b of the ratchet wheel 15 which is therefore locked against rotation. Then, the drive motor 18 is energized so that the drive ring 17 is turned clockwise and, thereafter, the motor 18 is stopped once. At this point, the lens setting ring 12 is locked since the anchor 16 locks the ratchet wheel 15. Thereafter, when the rocking motor M is energized, the anchor 16 is turned counterclockwise so that the locking pawl 16b of the anchor 16 disengages from the pawl 15b of the ratchet wheel 15.

The energization of the rocking motor M is such that the rocking motor is rocked alternately, first in a direction in which the locking pawl 16a and the next pawl 15b are engaged so that the lens setting ring 12 and the ratchet wheel 15 are turned by an angle corresponding to one-half of the pitch of the pawls 15b due to the urging force of the spring 13. Next, the rocking motor M is energized so that the anchor 16 is turned in the reverse direction so that the lens setting ring 12 and the ratchet wheel 15 are again turned by an angle corresponding to one-half pitch by the spring 13 in a similar manner as described above.

In order to turn the lens setting ring 12 to a predetermined focal position, the anchor 16 is alternately swung or pivoted a predetermined number of times corresponding to the desired focal position. When the lens setting ring 12 reaches the predetermined focal position, the rocking motor M is energized so as to maintain one of the locking pawls 16a or 16b in locking engagement with one of the pawls 15b. It is noted that the voltage required for energization of the rocking motor M to maintain the anchor 16 locked in position is lower than that for alternately swinging the anchor 16. That is, only a voltage which is of sufficient value to prevent the locking pawl 16a or 16b from being disengaged from the pawls 15b is applied to the rocking motor M.

After the lens setting ring 12 is located at the predetermined focal position, the drive ring 17 is further turned clockwise and, accordingly, the sector ring (not shown) is turned integrally with the drive ring 17. When the sector ring is turned, a shutter sector 19 is turned so as to open a lens opening portion 11b for exposure. When a predetermined exposure value has been obtained, the drive ring 17 is turned counterclockwise and, accordingly, the sector ring and the sector 19 are also turned counterclockwise so as to block or cover the lens opening portion 11b. Thus the shutter operation is completed. Even at this point, the rocking motor M is still energized at a voltage sufficient for preventing the locking pawl 16a or 16b and the pawls 15b from being disengaged from each other.

The drive ring 17 is continuously rotated further, and when the drive ring 17 is engaged with the engaging portion 12b of the lens setting ring 12, the rocking motor M is deenergized so as to disengage the ratchet wheel 15 from the anchor 16. Further, after the drive ring 17 engages with the engaging portion 12b of the lens setting ring 12, the drive ring 17 then turns the lens setting ring 12 counterclockwise, overcoming the urging force of the spring 13. The lens setting ring 12 is turned by the drive ring 17 up to a position exceeding its initial condition. Thereafter, when a locking portion of the ratchet wheel 15 is locked by a locking member (not shown), the lens setting ring 12 is locked by the locking member against the urging force of the spring 13. The lens drive ring 17 is then rotated clockwise again and is stopped at an initial position.

From the foregoing description, it can be seen that in the rocking motor according to the present invention, since the positions of the two poles of the permanent magnet of the rotor are located near the coil, a large power output can be efficiently obtained by a drive voltage which is lower than that conventionally required. Further, the rocking motor has very little magnetic affect outside of the rocking motor and is not hardly affected by an external magnetic field. Thus, it is possible to obtain a stable operation of the rocking motor. Furthermore, if the permanent magnet is magnetized with four poles, two of which are located near the coil, the manufacture of the permanent magnet is facilitated.

Moreover, if a yoke member is attached to the rocking motor, a higher power output can be efficiently obtained.

If the rocking motor is used in a shutter device for a camera so that a lens setting member is shifted by the rocking motor through a ratchet wheel in order to control the focal point, the shutter device can be focussed precisely with fine steps and can be driven with a low power consumption. Moreover, the influence of the magnetic fields from other components of the shutter device, such as a sector opening motor, is negligible.

We claim:

1. A rocking motor comprising: a hollow body member having a first end portion, a second end portion, and a connecting portion disposed between and interconnecting the first and second end portions; a coil wound on the connecting portion of the body member; a rotor rotatably supported near the first end portion of the body member, the rotor having a permanent magnet magnetized with two poles at a magnetization angle greater than 90 degrees but less than 180 degrees, and the poles being radially offset from the center of the rotor and toward the coil; and means for rotatably supporting the rotor near the first end portion of the body member.

2. A rocking motor as claimed in claim 1; wherein the poles have a magnetization angle of about 120 degrees.

3. A rocking motor as claimed in claim 1; wherein the permanent magnet is partially disposed within the hollow body member at the first end portion thereof.

4. A rocking motor as claimed in claim 1; wherein the means for rotatably supporting the rotor comprises a casing enclosing the body member and having a pair of bearing portions, the rotor having a center shaft rotatably supported by the bearing portions.

5. A rocking motor as claimed in claim 4; wherein the permanent magnet is disposed within the casing and is partially disposed within the hollow body member at the first end portion thereof.

6. A rocking motor as claimed in claim 1; further comprising means for preventing a magnetic force produced by the coil from leaking out of the rocking motor.

7. A rocking motor as claimed in claim 6; wherein the means for preventing comprises a yoke member having a base portion connected to the second end portion of the hollow body member, a pair of leg portions extending from the base portion, and a core portion connected to the base portion and extending into the hollow body member at the first end portion thereof.

8. A rocking motor as claimed in claim 7; wherein the yoke member is comprised of a magnetic material.

9. A rocking motor as claimed in claim 1; wherein the hollow body member has a recessed part at the first end portion thereof; and wherein the poles are located within the recessed part of the hollow body member.

10. A rocking motor comprising: a hollow body member having a first end portion, a second end portion, and a connecting portion disposed between and interconnecting the first and second end portions; a coil wound on the connecting portion of the body member; a rotor rotatably supported near the first end portion of the body member, the rotor having a permanent magnet magnetized with first and second pairs of poles, the first pair of poles having a magnetization angle greater than 90 degrees but less than 180 degrees and being radially offset from the center of the rotor and toward the coil and creating a greater magnetic force than the second pair of poles; and means for rotatably supporting the rotor near the first end portion of the body member.

11. A rocking motor as claimed in claim 10; wherein the second pair of poles is radially offset from the center of the rotor and away from the coil.

12. A rocking motor as claimed in claim 11; wherein the first pair of poles has a magnetization angle of about 120 degrees.

13. A rocking motor as claimed in claim 10; wherein the means for rotatably supporting the rotor comprises a casing enclosing the body member and having a pair of bearing portions, the rotor having a center shaft rotatably supported by the bearing portions.

14. A rocking motor as claimed in claim 13; wherein the permanent magnet is disposed within the casing and is partially disposed within the hollow body member at the first end portion thereof.

15. A rocking motor as claimed in claim 10; further comprising means for preventing a magnetic force produced by the coil from leaking out of the rocking motor.

16. A rocking motor as claimed in claim 15; wherein the means for preventing comprises a yoke member having a base portion connected to the second end portion of the hollow body member, a pair of leg portions extending from the base portion, and a core portion connected to the base portion and extending into the hollow body member at the first end portion thereof.

17. A rocking motor as claimed in claim 16; wherein the yoke member is comprised of a magnetic material.

18. A rocking motor comprising: a hollow body member having a first end portion, a second end portion, and a connecting portion disposed between and interconnecting the first and second end portions; a coil wound on the connecting portion of the body member; a rotor rotatably supported near the first end portion of the body member, the rotor having a permanent magnet magnetized with at least a first pair of poles having a magnetization angle greater than 90 degrees but less than 180 degrees, the first pair of poles being radially offset from the center of the rotor and towards the coil; means for rotatably supporting the rotor near the first end portion of the body member; and means for preventing a magnetic force produced by the coil from leaking out of the rocking motor.

19. A rocking motor as claimed in claim 18; wherein the first pair of poles has a magnetization angle of about 120 degrees.

20. A rocking motor as claimed in claim 19; further comprising a second pair of poles radially offset from the center of the rotor and away from the coil.

21. A rocking motor as claimed in claim 18; wherein the means for preventing comprises a magnetic yoke member having a base portion connected to the second end portion of the hollow body member, a pair of leg portions extending from the base portion, and a core portion connected to the base portion and extending into the hollow body member at the first end thereof.

22. A rocking motor as claimed in claim 18; wherein the hollow body member has a recessed part at the first end portion thereof; and wherein the first pair of poles is located within the recessed part of the hollow body member.

23. A rocking motor comprising: a hollow body member; a coil wound on the hollow body member; and a rotor rotatably supported near one end of the hollow body member, the rotor having a permanent magnet magnetized with at least a first pair of poles at a magnetization angle greater than 90 degrees but less than 180 degrees, the first pair of poles being radially offset from the center of the rotor and toward the coil.

24. A rocking motor as claimed in claim 23; wherein the permanent magnet is magnetized with a second pair of poles radially offset from the center of the rotor and away from the coil, the second pair of poles creating a lower magnetic force than the first pair of poles.

25. A rocking motor as claimed in claim 23; wherein the hollow body member has a recessed part at the end of thereof supporting the rotor; and wherein the first pair of poles are located within the recessed part.

26. A rocking motor as claimed in claim 23; wherein the first pair of poles has a magnetization angle of about 120 degrees.

* * * * *